(12) United States Patent
Lee et al.

(10) Patent No.: US 8,775,323 B2
(45) Date of Patent: Jul. 8, 2014

(54) METHOD AND SYSTEM FOR PROVIDING USER TAILORED SERVICE USING SOCIAL NETWORK SERVICE

(75) Inventors: Kang-Yong Lee, Daejeon (KR); Jaecheol Sim, Daejeon (KR); Hwa-Shin Moon, Daejeon (KR); Kee-Seong Cho, Daejeon (KR); Won Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/335,586

(22) Filed: Dec. 22, 2011

(65) Prior Publication Data

US 2012/0166280 A1 Jun. 28, 2012

(30) Foreign Application Priority Data

Dec. 23, 2010 (KR) ........................ 10-2010-0133996

(51) Int. Cl.
*G06Q 10/10* (2012.01)

(52) U.S. Cl.
USPC ...... 705/319; 705/7.33; 705/7.13; 705/14.16; 705/14.17

(58) Field of Classification Search
USPC .................. 705/319, 7.33, 7.13, 14.16, 14.17
See application file for complete search history.

(56) References Cited

U.S. PATENT DOCUMENTS

| 8,639,756 B2 * | 1/2014 | Bostrom et al. ............... 709/204 |
| 2005/0203929 A1 * | 9/2005 | Hazarika et al. ............... 707/100 |
| 2010/0161369 A1 * | 6/2010 | Farrell et al. ...................... 705/8 |
| 2010/0268830 A1 * | 10/2010 | McKee et al. .................. 709/228 |
| 2011/0047020 A1 * | 2/2011 | Iwazaki ...................... 705/14.33 |
| 2011/0196724 A1 * | 8/2011 | Fenton et al. ............... 705/14.16 |
| 2011/0213785 A1 * | 9/2011 | Kristiansson et al. ........ 707/748 |
| 2011/0238476 A1 * | 9/2011 | Carr et al. .................. 705/14.25 |
| 2012/0059848 A1 * | 3/2012 | Krishnamoorthy ........... 707/770 |

FOREIGN PATENT DOCUMENTS

| KR | 1020090059922 | 6/2009 |
| KR | 1020100011609 | 2/2010 |

OTHER PUBLICATIONS

Dudarenko, Natalia, Juwel Rana, and Kåre Synnes. "Ranking algorithm by contacts priority for social communication systems." Smart Spaces and Next Generation Wired/Wireless Networking. Springer Berlin Heidelberg, 2010. 38-49.*

Rana, Juwel, Johan Kristiansson, and Kare Synnes. "Enriching and simplifying communication by social prioritization." Advances in Social Networks Analysis and Mining (ASONAM), 2010 International Conference on. IEEE, 2010.*

Chun, Hyunwoo, et al. "Comparison of online social relations in volume vs interaction: a case study of cyworld." Proceedings of the 8th ACM SIGCOMM conference on Internet measurement. ACM, 2008.*

(Continued)

*Primary Examiner* — Jonathan G Sterrett
*Assistant Examiner* — Tzu-Hsiang Lan
(74) *Attorney, Agent, or Firm* — Nelson Mullins Riley & Scarborough LLP

(57) ABSTRACT

Provided are a method and a system for providing a user tailored service using a social network service. The method includes at a user terminal, receiving a transaction approval message from a credit card company server when a customer uses a credit card, and obtaining purchase information of the customer based on the received transaction approval message, and forming a social network for sharing the purchase information of the customer with predetermined persons having a social relationship, wherein the predetermined persons include friends, family members, and colleagues of the customer.

14 Claims, 2 Drawing Sheets

(56) References Cited

OTHER PUBLICATIONS

Onnela, Jukka-Pekka, et al. "Analysis of a large-scale weighted network of one-to-one human communication." New Journal of Physics 9.6 (2007): 179.*

Yoo, Shinjae, et al. "Mining social networks for personalized email prioritization." Proceedings of the 15th ACM SIGKDD international conference on Knowledge discovery and data mining. ACM, 2009.*

Leenders, Roger Th AJ. "Modeling social influence through network autocorrelation: constructing the weight matrix." Social Networks 24.1 (2002): 21-47.*

Totterdell, Peter, David Holman, and Amy Hukin. "Social networkers: Measuring and examining individual differences in propensity to connect with others." Social Networks 30.4 (2008): 283-296.*

Roth, Maayan, et al. "Suggesting friends using the implicit social graph." Proceedings of the 16th ACM SIGKDD international conference on Knowledge discovery and data mining. ACM, 2010.*

Antonio Paez et al. "Weight matrices for social influence analysis: An investigation fo measurement errors and their effect on model identification and estimation quality," Social Networks 30 (2008): 309-317.*

* cited by examiner

Card information : BC card (0800)
Member store : E-mart
TOTAL SUM : 50,000
Time of using : 2010.06.10 07:10:35

Purchaser : A
Member store : McDonalds at Dejoen
Purchase date : 2010/06/20
Rating : ★★★★
Comments : Cheap and delicious

METHOD AND SYSTEM FOR PROVIDING USER TAILORED SERVICE USING SOCIAL NETWORK SERVICE

CROSS-REFERENCE TO RELATED APPLICATIONS

The present application claims priority of Korean Patent Application No. 10-2010-0133996, filed on Dec. 23, 2010, which is incorporated herein by reference in its entirety.

BACKGROUND OF THE INVENTION

1. Field of the Invention

Exemplary embodiments of the present invention relate to a user tailored service; and, more particularly, to a method and a system for providing a user tailored service using a social network service, which detect purchase tendencies of customers through credit card transaction information, configure a social network in real time using call histories of customers, and provide a user-tailored service using a social network service for selectively sharing purchase information of customers through the social network.

2. Description of Related Art

A social network service is a service that enables users to share information or opinions with others who have a social relationship. Individuals have such social relationship may be friends, family members, and colleagues.

Many studies have been made on technologies for providing advertisements to users or recommending specific products to consumers. That is, purchase preferences of consumers have been predicted using their purchase histories. Based on the predicted purchase preferences of consumers, advertisements were provided to the consumers, and specific products were recommended to consumers who are likely to respond.

Related technologies have used network based systems, such as central storage systems or databases, to collect the purchase histories of consumers. Accordingly, it has taken a comparative long time to collect the related information. It has been difficult to obtain accurate information of purchasers due to security restrictions and storage capacity limitations. Furthermore, specific systems have been required to collect the purchase histories of consumers or there have been many restrictions in obtaining the purchase histories.

Potentially, a consumer's purchasing tendencies could influence others in his or her social network by providing a user tailored service such as product advertisements or recommendations to consumers. A consumer has a predetermined social relationship with others in his or her social network.

Technologies already in use have provided a user-tailored service only based on an individual's purchase tendency. Other consumer's purchasing tendencies have not been reflected in providing a user tailored service. Although others purchase tendencies were reflected in providing the user tailored service, a social relationship between one and others has not been considered.

Moreover, most of the technologies for providing a user tailored service have required a centralized system. That is a central storage system has been required to collect and manage user information, or user information has been collected and managed through the internet. Therefore, many problems have arisen in data security and personal privacy protection.

SUMMARY OF THE INVENTION

An embodiment of the present invention is directed to a method and a system for providing a user tailored service to consumers based on purchase information created by credit card use and for using a social network service for selectively sharing purchase information of individual with others having a predetermined relationship, such as family members, friends, and colleagues.

Another embodiment of the present invention is directed to a method and a system for providing a user tailored service using a social network service that extracts purchase tendency and purchase characteristics of a consumer based on purchase history, searches stores based on the extracted purchase tendency and characteristics, and recommends the searched stores.

Still another embodiment of the present invention is directed to a method and a system for providing a user tailored service using a social network service, which share one's purchase information with others through a social network service and obtains a purchase history of a predetermined individual through the shoring information.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for providing a user tailored service using a social network service includes: at a user terminal, receiving a transaction approval message from a credit card company server when a customer uses a credit card, and obtaining purchase information of the customer based on the received transaction approval message; and forming a social network for sharing the purchase information of the customer with predetermined persons having a social relationship, wherein the predetermined persons include friends, family members, and colleagues of the customer.

In accordance with another embodiment of the present invention, an apparatus for providing a user tailored service using a social network service, includes a communication unit configured to receive a transaction approval message from a credit card company server when a customer uses a credit card; a purchase information memory configured to member store purchase information; a purchase information extracting unit configured to extract purchase information including information about a member store, a purchase amount, and a duration, and member store the extracted purchased information in the purchase information memory; a purchase tendency extracting unit configured to obtaining past purchase information and purchase information member stored in the purchase information memory and detecting purchase tendency and purchase character of a customer based on the purchase information; a service providing unit configured to provide information about member stores near to a current location of a customer by searching member stores and store location information stored in the purchase information memory, and search and provide information about member stores matched with a past purchase tendency of a customer; a call information memory configured to store call information and message information extracted whenever a call is made and a message is sent; a call information extracting unit configured to obtain the call information and the message information whenever a call is made and a message is sent and store the obtained call information and the obtained message information; a social information extracting unit configured to obtain social information from the call information and the message information stored in the call information memory and form a social network of a corresponding customer based on the obtained social information; and a social information memory configured to store information of the social network as social community information.

DESCRIPTION OF SPECIFIC EMBODIMENTS

Figures 1, 2:
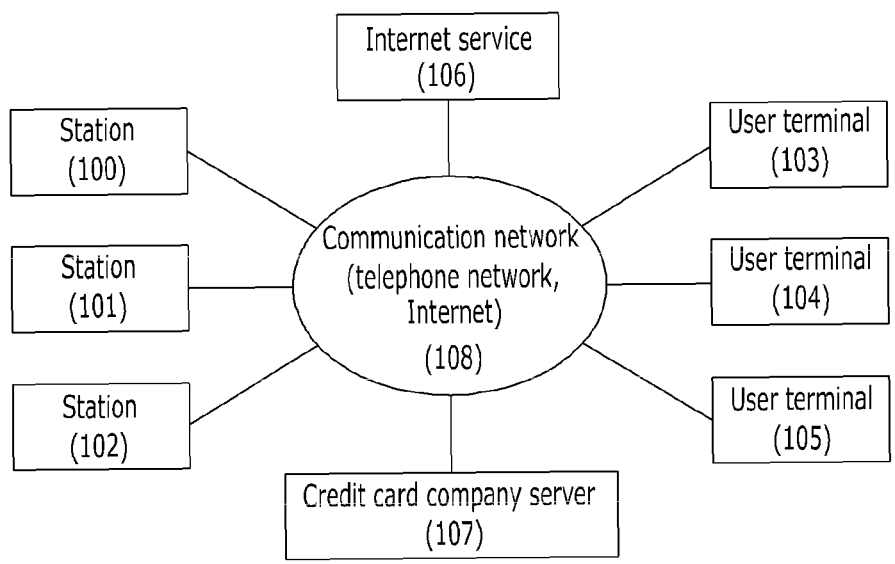
FIG. 1 illustrates a communication network for providing a user tailored service using a social network service in accordance with an embodiment of the present invention.
FIG. 2 illustrates a transaction approval information message used in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention relates to a method and a system for providing a user tailored service using a social network service in accordance with an embodiment of the present invention. According to embodiments of the present invention, a terminal receives a approval message when a use uses a credit card, processes the received approval message to obtain purchase information of the user, analyzes a purchase tendency based on the processed approval message, forms a social network based on a call history, and shares the purchase history with others having a social relationship with the use to help others purchase.

FIG. 1 is a diagram schematically illustrating a network for providing a user tailored service using a social network service in accordance with an embodiment of the present invention. Credit card companies provide relates services through the same network configuration shown in FIG. 1.

Referring to FIG. 1, the network includes stations 100, 101, and 102, user terminals 103, 104, 105, an Internet service providing server 106, and a credit card company server 107. The stations 100, 101, and 102 are credit card reader installed in stores. The stations 100, 101, and 102 transmit credit card information of customers to the credit card company server 107.

The user terminals 103, 104, and 105 are owned by users who use a credit card. The user terminals 103, 104, and 105 are mobile stations that are capable of making a call and accessing Internet. Furthermore, the user terminals 103, 104, and 105 include a locating system, such as a global positioning system (GPS), for detecting the current location of a user. For example, the user terminals may be a smart phone. The Internet service providing server 106 is a server that provides an Internet accessing service. For example, the Internet service providing server 106 may provide various services such as a map providing service and an internet search service.

When a user uses a credit card to buy a product, the stations 100, 101, and 102 transmit corresponding purchase information to the credit card company server 107 through a communication network 108. Then, the credit card company server 107 transmits simple transaction approval information to the user terminals 103, 104, and 105 using a text message such as a short message service (SMS) or a multimedia messaging service (MMS) in order to prevent illegal use of a credit card. For example, the communication network 108 may be a pre-existing telephone network or the internet.

The transaction-approval message is a typical service that is currently provided by a credit card company. Such a transaction-approval message may include information shown in FIG. 2. FIG. 2 illustrates a typical transaction approval message currently provided to a user.

As described above, the user terminals 103, 104, and 105 receive the transaction-approval message of FIG. 2 from the credit card company server 107 through the network 108 and obtain corresponding purchase information from the received transaction-approval message. For example, when a user purchases a product using a credit card from a member store, the user terminals 103, 104, and 105 receive the transaction approval message of FIG. 2 in a form of a text message such as SMS or MMS. The member store may be a store that joins to a credit card company or a service providing company as a member thereof.

Figures 3, 4:
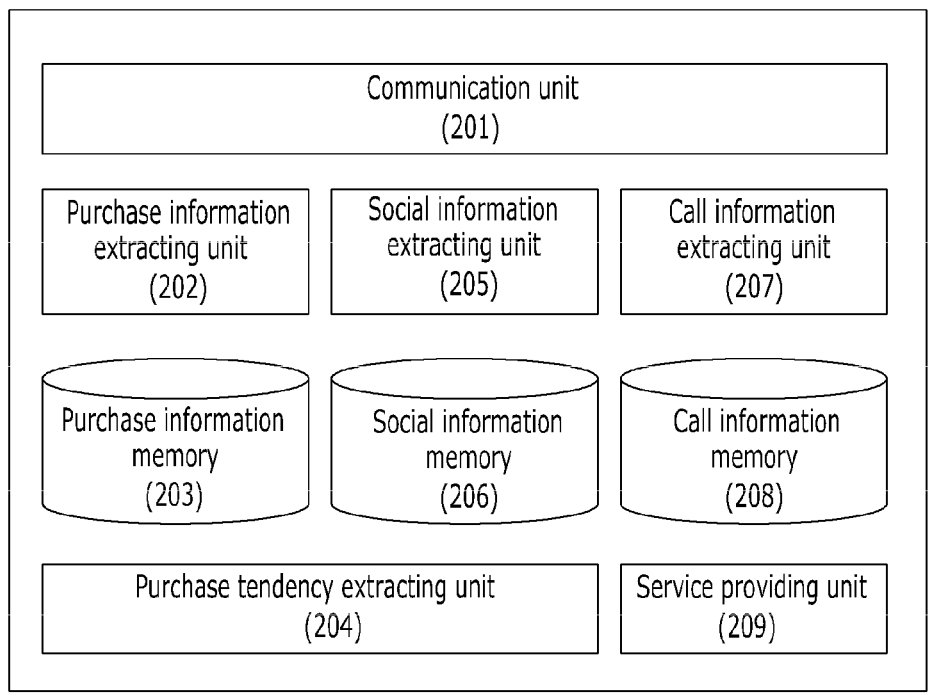
FIG. 3 is a block diagram illustrating a user terminal providing a user tailored service using a social network service in accordance with an embodiment of the present invention.
FIG. 4 illustrates a purchase information sharing message provide through a terminal of FIG. 3.

Then, the user terminals 103, 104, and 105 extract purchase information from the received transaction-approval messages. Such user terminals 103, 104, and 105 have configuration shown in FIG. 3. FIG. 3 is a block diagram illustrating a user terminal for providing a user-tailored service using a social network service in accordance with an embodiment of the present invention.

Referring to FIG. 3, the user terminal includes a communication unit 201, a purchase information-extracting unit 202, a purchase information memory 203, a purchase tendency-extracting unit 204, a social information-extracting unit 205, a social information memory 206, a communication information-extracting unit 207, a communication information memory 208, and a service-providing unit 209. The communication unit 201 performs a wired/wireless data communication function. For example, the communication unit 201 transmits and receives messages, makes and receives calls, and accesses the internet through a communication network. Accordingly, the communication unit 201 receives a transaction-approval message from the credit card company server 107 when a consumer uses a credit card.

The purchase information extracting unit 202 extracts purchase information from the received transaction-approval message and stores the extracted purchase information in the purchase information memory 203. The purchase information may include information about a credit card member store, a price, and duration. Since the user terminal receives the transaction approval message in real time, the user terminal can detect a current location of a credit card member store and store the detected location of the credit card member store in the purchase information memory 203. Such store location information may be expressed as unique numeral value such as GPS measurements.

As described above, the purchase information is stored in and managed by the user terminal. Therefore, it is simpler and safer with respect to data security and personal privacy than a related technology that collects and manages user information in a central storage system of a communication network.

A transaction approval message transmitting method has been realized and known to public. Accordingly, a method for extracting the purchase information from the transaction-approval message and storing the extracted information according to the present embodiment may be easily realized as a simple program that can be performed by a user terminal without modification of the known transaction approval message transmitting method. Therefore, a data security problem, an information management problem, and a personal privacy problem can be eliminated.

As a second stop, purchase tendency and characteristics are extracted from the obtained purchase information, and a user tailored service is provided based on the extracted information.

The purchase tendency extracting unit 204 and the service-providing unit 209 analyze the purchase tendency and characteristics of a user using the stored purchase-information in the purchase information memory 203. Based on the results of the analysis, the service providing unit 209 provides the user-tailored service. For example, the service-providing unit 209 may provide the following services as the user tailored service.

First, the service providing unit 209 may provide information about credit card member stores nearest the current location of the user. The provided information may be information about credit card member stores that the user frequently visits. In order to provide such a service, the user terminal detects the current location of the user. Since the user terminal has a locating function for detecting a current location as described above, such a service can be easily realized. For example, a typical smart phone generally has the locating function Then, the service providing unit 209 searches information about credit card member stores and their locations from the purchase information memory 203 and provides the user with information about the credit card member stores near the current location of a user. Here, a user may set search criteria for searching credit card member stores. For example, if a user sets the search criteria as "within 100 m", the service providing unit 209 searches member stores located within 100 m from the current location of a user from the purchase information memory 230 and provides the search results to the user. Furthermore, the service providing unit 209 can provide credit card member store information sorted by most recently visited or most frequently visited stores.

Second, the user terminal analyzes a past purchase tendency, searches similar stores based on the analysis result, and recommends stores to a user based on the search result. The purchase tendency extracting unit 204 obtains past purchase information of a user from the purchase information memory 203 and analyzes the purchase tendency and characteristics based on the obtained information. The service providing unit 209 searches similar stores around a current location of a user through the Internet based on the analysis result and informs the user of the searched stores.

For example, if the past purchase information indicates that a user frequently visits restaurants on weekend nights, and if the user searches "restaurant" on Sunday night, the user terminal obtains information on credit card member restaurants based on a current location of the user through the Internet and provides the obtained information to the user.

Here, the embodiments of the present invention are only directed to the method and the system for providing the user tailored service. An algorithm or a method for analyzing a purchase tendency of a user and extracting characteristics from the purchase information is not an objective of the present invention.

As a third step, the user terminal forms a social network of a user to share purchase information with others having a predetermined social relationship with the user. For example, the user terminal forms a social network of family members, friends, and colleagues of a corresponding user.

In general, information obtained from individuals having a predetermined social relationship with a user can significantly influence the user's future purchasing decisions. Hereinafter, a method for forming a social network for sharing purchase information with predetermined individuals will be described.

First, the user terminals 103, 104, and 105 obtain communication information in real time whenever a user makes a call or sends a message. The communication information includes call information and message information. The call information is information generated based on calls made by a user. The call information may include an other party ID such as a name, call duration, and a telephone number. The message information is information created based on a message sent by a user. The message information may include a message recipient ID such as a name of a message recipient and contact information such as telephone number or an email address.

Then, the communication information extracting unit 207 obtains the call information and the message information whenever a user makes a phone call or sends a message and stores the obtained communication information in the information memory 208. Each user terminal may collect and obtain the call information and the message information individually.

The social information extracting unit 205 obtains the call information and the message information from the communication information memory 208 and uses the obtained information to form a social network of a user. Such information may be defined as social information.

Hereinafter, a method for forming a social network using the social information at the social information extracting unit 205 will be described.

First, the social information extracting unit 205 analyzes the call information in the social information and calculates a call weight $PW_i$ of a person i based on Equation 1 below.

$$PW_i = \{P_W + (P_M * 0.5) + (P_Y * 0.1)\} * T \quad \text{Eq. 1}$$

In Equation 1, $PW_i$ denotes a call weight of person i. $P_W$ represents the number of calls made to a person i for one week. $P_M$ is the number of calls made to a person i for one month. $P_Y$ is the number of calls made to a person i for one year. T denotes average duration of a call made to a person i.

Then, the social information extracting unit 205 analyzes message information of the social information and calculates a message weight $MW_i$ for message recipient i based on the analysis result using Equation 2 below.

$$MW_i = \{M_W + (M_W * 0.5) + (M_Y * 0.1)\} \quad \text{Eq. 2}$$

In Equation 2, $MW_i$ denotes a message weight for a user i. $M_W$ denotes the number of messages sent to a user i for one week. $M_M$ denotes the number of messages sent to a user i for one month. $M_Y$ denotes the number of messages sent to a user i for one year.

Using Equation 1 and Equation 2, the social information extracting unit 205 calculates a social weight $SW_i$ for a person i or message recipient i using the call weight $PW_i$ and the message weight $MW_i$.

$$SW_i = PW_i + MW_i \quad \text{Eq. 3}$$

The social information extracting unit 205 forms a social network using the social weights of each communication component such as callees and message recipients.

For example, a social network is formed in an order of the social weight. Then, the predetermined number of individuals having highest social weight may be considered to have a social relationship with a user. Alternatively, individuals having a social weight greater than a predetermined value are considered to have a social relationship with the user. The social information extracting unit 205 stores the social network information in the social information memory 206. Such social network information is referred to as social community information.

A user may share the social community information with predetermined individuals by sending a text message such as SMS or MMS. Here, selective information or entire information stored in the purchase information memory 203 may be transmitted. Such a message is referred to as a purchase information sharing message. The purchase information sharing message includes information on a purchaser, a store, a purchase date, a rating, and a comment.

For example, if a user A buys a hamburger from McDonalds and wants to transmit purchase information with a comment of "cheap and delicious" to a predetermined individual in a social community, the user transmits a purchase information sharing message as shown in FIG. 4. FIG. 4 exemplary illustrates a purchase information sharing message provided through a user terminal of FIG. 3.

A user may receive a purchase information sharing message from a predetermined individual in social community through the communication unit 201. When the user terminal receives the purchase information sharing message, the social information extracting unit 205 extracts information such as purchaser, store, purchase date, rating, and comments from the received message and stores the extracted information in the social information memory 206. Such information that are extracted from the purchase information sharing message and stored in the social information memory is referred to as social purchase information.

The service proving unit 209 may provide a user tailored service based on the social purchase information. For example, the service providing unit 209 searches a credit card member store that a predetermined individual in a social community frequently visits and provides information about the credit card member store. Second, the service providing unit 209 searches credit card member stores around the current location of a user and provides the information about the searched stores. Third, the service providing unit 209 searches member stores having a rating greater than a predetermined level and provides information about the searched stores. Other services may be developed based on the social purchase information and provided to a user through the service proving unit 209.

After receiving a purchase information sharing message from a predetermined individual, a user may forward the received purchase information sharing message with an opinion to others. Here, the communication unit 201 forwards the received purchase information sharing message.

As described above, the method and the system according to the present embodiments provide a user tailored service to consumers based on purchase information created by credit card use and use a social network service for selectively sharing purchase information of individual with others having a predetermined relationship, such as family members, friends, and colleagues. Accordingly, the method and the system according to the present embodiments can improve customer satisfaction to related services.

Furthermore, the method and the system according to the present embodiments can extract purchase tendencies of consumers based on purchase information and search and recommend stores that consumers might like.

Moreover, the method and the system according to the present embodiments collect and manage user information such as past purchase information at a user terminal, not a central storage system on a network. Accordingly, it is possible to enhance data security and to protect personal privacy.

In addition, the method and the system according to the present embodiments use user information obtained by a portable telephone or a smart phone without requiring new equipment or new method for obtaining user information. Accordingly, the method and the system according to the present embodiment can be realized without requiring additional equipment or conditions.

While the present invention has been described with respect to the specific embodiments, it will be apparent to those skilled in the art that various changes and modifications may be made without departing from the spirit and scope of the invention as defined in the following claims.

What is claimed is:

1. A method for providing a user tailored service using a social network service, comprising:
   at a user terminal, receiving a transaction approval message from a credit card company server when a customer uses a credit card, and obtaining purchase information of the customer based on the received transaction approval message; and
   forming a social network for sharing the purchase information of the customer with predetermined persons having a social relationship,
   wherein the predetermined persons include friends, family members, and colleagues of the customer,
   wherein said forming a social network includes:
      at the user terminal, obtaining call information and message information in real time whenever the customer makes a call and sends messages;
      obtaining and storing the call information and the message information whenever the customer makes calls and sends messages; and
      defining, by a processor, social information based on the member stored call information and the message information, and forming the social network of the customer based on the social information, and
   wherein said forming a social network includes:
      analyzing, by the processor, the call information in the social information of the customer and calculating a call weight of a predetermined person using an equation of:

$$PW_i = \{P_W + (P_M * 0.5) + (P_Y * 0.1)\} * T,$$

where $PW_i$ denotes a call weight of a person i, $P_W$ represents a number of calls made to the person i for one week, $P_M$ is a number of calls made to the person i for one month, $P_Y$ is a number of calls made to the person i for one year, and T denotes average duration of calls made to the person i;
   analyzing the message information in the social information of the customer and calculating a message weight of a predetermined person using an equation of:

$$MW_i = \{M_W + (M_W * 0.5) + (M_Y * 0.1)\},$$

where $MW_i$ denotes a message weight for a person i, $M_W$ denotes a number of messages sent to the person i for one week, $M_M$ denotes a number of messages sent to the person i for one month, and $M_Y$ denotes a number of messages sent to the person i for one year;
   calculates a social weight of a predetermined person by adding the call weight and the message weigh using equation of:

$$SW_i = PW_i + MW_i,$$

wherein $SW_i$ denotes the social weight of a person i; and forms a social network using the social weight of each person.

2. The method of claim 1, wherein the user tailored service is provided to the customer based on purchase tendency and purchase characteristics which are extracted from the obtained purchase information, and wherein the user tailored service includes:

a service for providing information on member stores that are near to a current location and the customer frequently visits by detecting the current location of the user terminal and the detected current location as a location of a member store because the user terminal receives the transaction approval message in real time; and a service for recommending member stores that the customer likes by obtaining past purchase information of the customer, analyzing purchase tendency based on the obtained past purchase information, searching member stores having matched with the purchase tendency of the customer, and recommending the searched member stores.

3. The method of claim 1, wherein the call information includes other party ID, duration, and contact information, and wherein the other party ID include a name of other party, and contact information includes a telephone number.

4. The method of claim 1, wherein the message information includes an other party ID and contact information, and wherein the other party ID include a name of other party, and contact information include a telephone number and an email address.

5. The method of claim 1, wherein said forming a social network using the social weight of each person includes:

forming a social network in an order of the social weight, defining social community information by considering a predetermined number of persons having a highest social weight as persons having a social relationship with the customer or by considering persons having a social weight greater than a predetermined value, and storing the defined social community information;

transmitting a purchase information sharing message to all of persons or selective persons in the social community information using a text message to share entire or selective purchase information of the customer;

receiving a purchase information sharing message at the user terminal from a predetermined person; and extracting purchaser information, member store information, purchase date information, rating information, and comments from the received purchase information sharing message and storing the extracted information as social purchase information at the user terminal.

6. The method of claim 5, wherein the purchase information sharing message includes purchaser information, member store information, purchase date information, and comments.

7. The method of claim 5, wherein the user tailored service is at least one of a service of searching member stores that a predetermined person in a social community of the customer frequently visits and providing the searched member stores, a service of searching a nearest member stores and providing the searched member stores, and a service of searching member stores having rating greater than a predetermined level and providing the searched member stores.

8. The method of claim 5, further comprising:

after the customer receives a purchase information sharing message from a predetermined person, adding opinions to the received purchase information sharing message and retransmitting the received purchase information sharing message to a predetermined person in a social community of the customer.

9. An apparatus for providing a user tailored service using a social network service, comprising:

a purchase information memory configured to store member store purchase information;

a call information memory configured to store call information and message information extracted whenever a call is made or a message is sent;

a social information memory configured to store information of a social network as social community information; and at least one processor configured to execute:

a communication unit configured to receive a transaction approval message from a credit card company server when a customer uses a credit card;

a purchase information extracting unit configured to extract purchase information including information about a member store, a purchase amount, and a duration, and member store the extracted purchased information in the purchase information memory;

a purchase tendency extracting unit configured to obtain past purchase information stored in the purchase information memory and detect purchase tendency and purchase character of a customer based on the purchase information;

a service providing unit configured to provide information about member stores near to a current location of a customer by searching member stores and store location information stored in the purchase information memory, and search and provide information about member stores matched with a past purchase tendency of a customer;

a call information extracting unit configured to obtain the call information and the message information whenever a call is made and a message is sent and store the obtained call information and the obtained message information; and a social information extracting unit configured to obtain social information from the call information and the message information stored in the call information memory and form the social network of a corresponding customer based on the obtained social information, wherein the social information extracting unit:

analyzes the call information in the social information of the customer and calculates a call weight of a predetermined person using an equation of:

$$PW_i = \{P_W + (P_M * 0.5) + (P_Y * 0.1)\} * T,$$

where $PW_i$ denotes a call weight of a person i, $P_W$ represents a number of calls made to the person i for one week, $P_M$ is a number of calls made to the person i for one month, $P_Y$ is a number of calls made to the person i for one year, and T denotes average duration of calls made to the person i;

analyzing the message information in the social information of the customer and calculates a message weight of a predetermined person using an equation of:

$$MW_i = \{M_W + (M_W * 0.5) + (M_Y * 0.1)\},$$

where $MW_i$ denotes a message weight for a person i, $M_W$ denotes a number of messages sent to the person i for one week, $M_M$ denotes a number of messages sent to the person i for one month, and $M_Y$ denotes a number of messages sent to the person i for one year;

calculates a social weight of a predetermined person by adding the call weight and the message weigh using equation of:

$$SW_i = PW_i + MW_i,$$

wherein $SW_i$ denotes the social weight of a person i; and forms a social network using the social weight of each person.

10. The apparatus of claim 9, wherein the social information extracting unit forms a social network in an order of the calculated social weights, defines social community information by considering a predetermined number of persons having a highest social weight as persons having a social relationship with the customer or by considering persons having a social weight greater than a predetermined value, and stores the defined social community information.

11. The apparatus of claim 9, wherein the service providing unit further provides information about member stores sorted by a distance from a current location of a customer to member stores, information about member stores sorted in an order of a total purchase amount, and information about member stores sorted by visiting frequency.

12. The apparatus of claim 9, wherein the purchase information extracting unit detects a current location of a user terminal, considers the detected location as a location of a member store, and stores the location of the member store.

13. The apparatus of claim 9, wherein the call information includes an other party ID, a call duration, and contact information, and wherein the other party ID includes a name of other party and the contact information include a telephone number.

14. The apparatus of claim 9, wherein the message information includes an other party ID and contact information, and wherein the other part ID includes a name of an other party and the contact information includes a telephone number and an email address of other party.

* * * * *